E. L. SMITH.
LACE BRAIDING MACHINE.
APPLICATION FILED JULY 1, 1921.

1,427,172.

Patented Aug. 29, 1922.
3 SHEETS—SHEET 1.

INVENTOR
Edwin Leroy Smith
By W. W. Williamson, Atty.

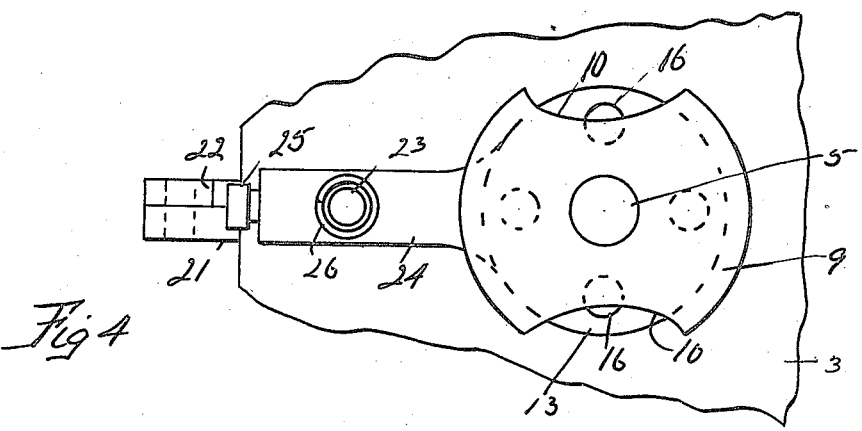
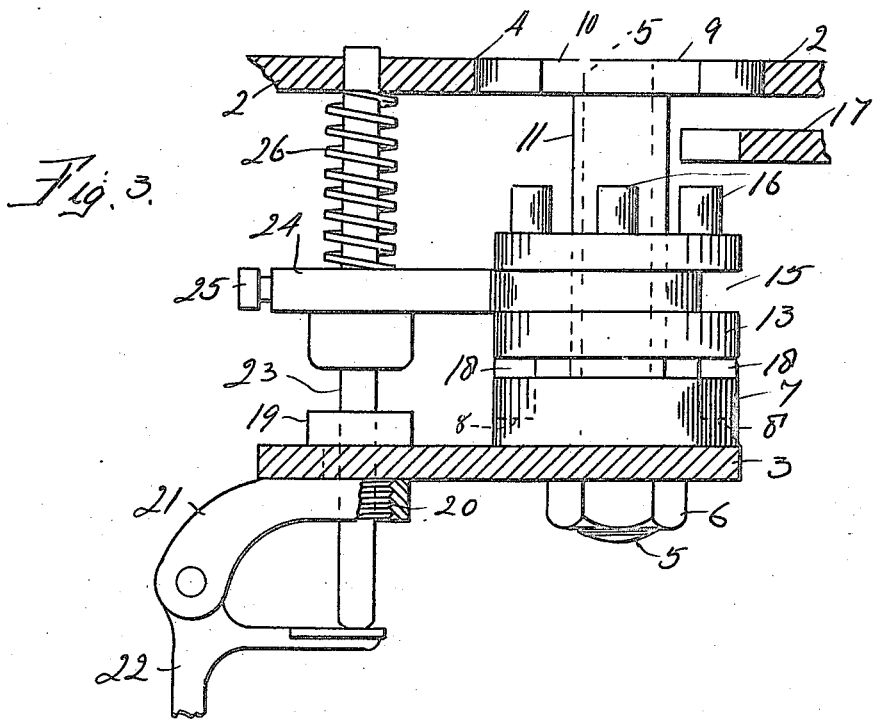

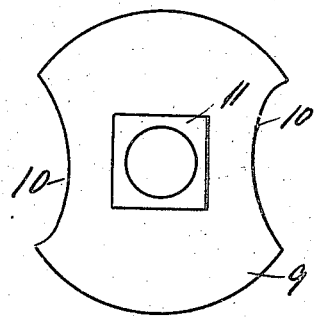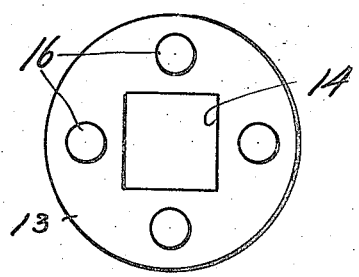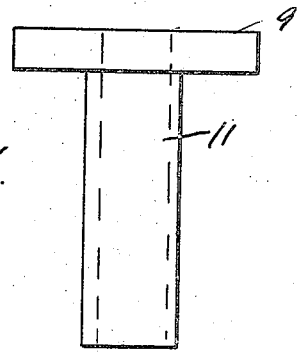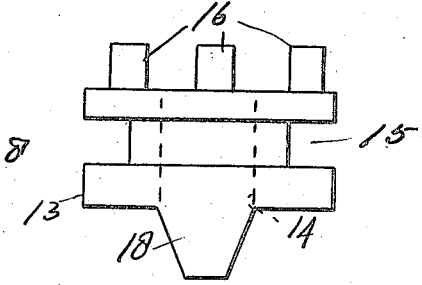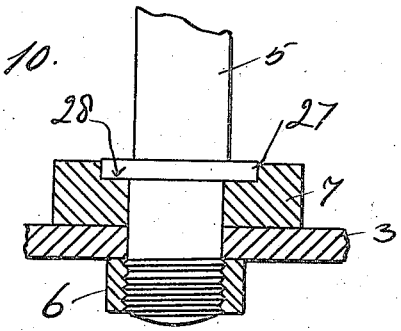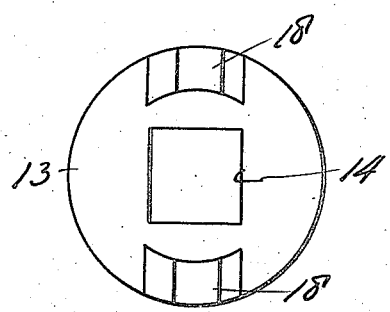

UNITED STATES PATENT OFFICE.

EDWIN LEROY SMITH, OF PHILADELPHIA, PENNSYLVANIA, ASSIGNOR TO OSCAR BRANCH, OF PHILADELPHIA, PENNSYLVANIA.

LACE-BRAIDING MACHINE.

1,427,172.   Specification of Letters Patent.   Patented Aug. 29, 1922.

Application filed July 1, 1921. Serial No. 481,761.

*To all whom it may concern:*

Be it known that I, EDWIN LEROY SMITH, a citizen of the United States, residing at Philadelphia, in the county of Philadelphia and State of Pennsylvania, have invented new and useful Improvements in a Lace-Braiding Machine, of which the following is a specification.

My invention relates to new and useful improvements in lace braiding machines, and has for its object to provide a new and improved means and mode of actuating and locking the carrier-driver disc.

Another object of the invention is to provide a fixed locking disc on each fixed post carrying the carrier-driver discs and to provide an element for coaction with said locking block which is slidably mounted upon the squared shank or sleeve of each carrier-driver disc, said element being actuated by a mechanism controlled by the Jacquard or pattern mechanism.

A further object of the invention is to so construct and arrange the means for controlling the operations of the carrier-driver discs that the combined driving element and locking device will be disengaged from the rack and locked by gravity assisted by the tension of a spring which not only adds speed to the operations but will positively disengage the drive element from the rack and lock the carrier-driver disc should any part thereof connected with the Jacquard mechanism or said Jacquard mechanism break or become disabled.

A still further object of the invention is to provide a locking block having a central recess for the reception of a collar on the fixed post whereby said locking block is held in position by said collar and the bottom plate on which said block rests.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is a section at the line 3—3 of Fig. 1 through the raceway bottom plates with the operating members in elevation.

Fig. 4, is a plan view thereof with the raceway plate and operating rack removed.

Fig. 5, is an inner end view of one of the carrier-driver discs.

Fig. 6, is a side elevation thereof.

Fig. 7, is a plan view of one of the combined driving and locking devices.

Fig. 8, is a side elevation thereof.

Fig. 9, is a bottom plan view thereof.

Fig. 10, is a fragmentary sectional view through the bottom plate and one of the locking blocks showing the manner of fastening the latter by means of the fixed post.

Figure 1:
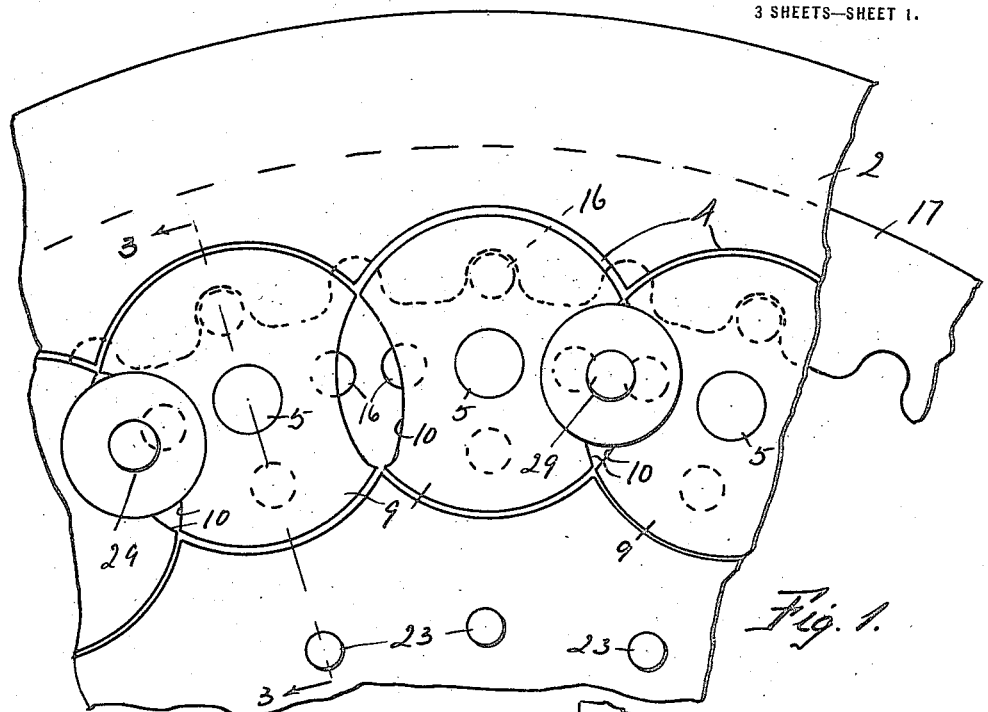
Fig. 1, is a fragmentary plan view of the raceway plate of a lace braiding machine illustrating the application of my invention.

In carrying out my invention as here embodied, 2 represents a top or raceway plate and 3 the bottom plate, said plates being arranged as usual in machines of this character and the top plate is provided with intersecting raceway circle openings 4. In the bottom plate concentric with said circle openings are mounted the fixed posts 5 which are held in place by nuts 6 threaded on their lower ends and jambed against the lower face of the bottom plate 3. Each of these fixed posts has a collar 27 formed integral therewith adjacent its lower end which fits into a recess 28 formed in the upper face of the locking block 7 and coacting with the latter to hold the same in a stationary position upon the bottom plate 3 and each of said locking blocks has a pair of oppositely disposed tapered or V shaped notches 8 therein.

Revolubly mounted upon the fixed post is a carrier-driver disc 9 provided with the ordinary carrier rest recesses 10 and having a shank or barrel 11 formed integral therewith, said shank being rectangular in cross section as shown in Fig. 5 and the lower end of this barrel rests directly upon the collar 27.

Slidably mounted upon said shank or barrel is a combined driving and locking member 13 having a rectangular opening 14 for registration with the rectangular shank or barrel 11 and also provided with an annular groove 15 with which registers a forked arm to be hereinafter described. From the upper portion of the member 13 project a plurality of gear pins 16 which are intermittently moved into the path of travel of the rack 17 which is mounted in any suitable or well known manner and driven in any desirable or obvious way. From the lower portion of the member 13 project the oppositely disposed tapered or wedge shaped locking horns 18 which under certain conditions, or when the gear pins are disengaged from the rack, are adapted to register with the V shaped notches 8 in the locking block 7.

The numeral 19 denotes a bushing having an externally threaded shank 20 passing through a hole in the bottom plate 3 with a bracket 21 having threaded engagement with said shank thereby mounting the bracket in its proper position and also holding the bushing in place.

To the outer end of the bracket is pivoted a suitable bell crank lever 22 one arm of which is connected in any suitable manner with the Jacquard or pattern mechanism, while the other arm normally contacts with the rounded end of the rod 23 which is slidably mounted in the bushing 19 and passes through a hole in the top of the raceway plate 2.

On said rod is adjustably mounted the forked arm 24 which is held in place by a set screw 25 and the forked end thereof projects into the groove 15 in the member 13. The weight of the member 13 and the forked arm 24 tend to cause said parts and the rod 23 to move downward and in order to make this downward movement positive a spring 26 is coiled about the rod 23 with one end engaging the underside of the top plate 2 as the stationary member and the other end engaging the forked arm 24 as the movable element so that any movement of the parts caused by the Jacquard mechanism will be against the tension of said spring and gravity or the weight of the parts.

From the foregoing description it will be noted that when the bell crank lever 22 is actuated in the proper direction by the Jacquard or pattern mechanism the locking horns 18 will be withdrawn from the V shaped notches 8 in the locking block simultaneously with the moving of the gear pins 16 into the path of travel of the rack 17 and the oscillating movement of the latter will rotate the member 13 and since it is mounted on the rectangular shank or barrel 11 carried by the carrier-driver disc, said disc will likewise be rotated thereby causing the bobbin carrier or carriers 29 which are in engagement with the operated disc to be carried to the opposite side of the race circle and as soon as the movement has been completed and the bell crank lever 22 released by the Jacquard mechanism the parts will immediately move downward because of their own weight and the action of the spring 26 thus disengaging the gear pins 16 from the rack 17 and causing the locking horns 18 to enter the notches 8 which will thus lock the driver-carrier disc until the parts are again actuated by the Jacquard mechanism. If the rotation of the driver-carrier disc was not sufficient to move the bobbin carrier to exactly the desired position the entrance of the locking horns into their respective V shaped notches will cause the parts to move the desired additional distance to properly center the driver-carrier disc which will obviously properly position the bobbin carriers.

It is to be particularly noted that due to the construction herein described should the Jacquard mechanism or the parts associated therewith for actuating the member 13 break or otherwise get out of order so that no pressure is exerted upon the rod 23 the parts will assume their inoperative or locked positions.

Figure 2:
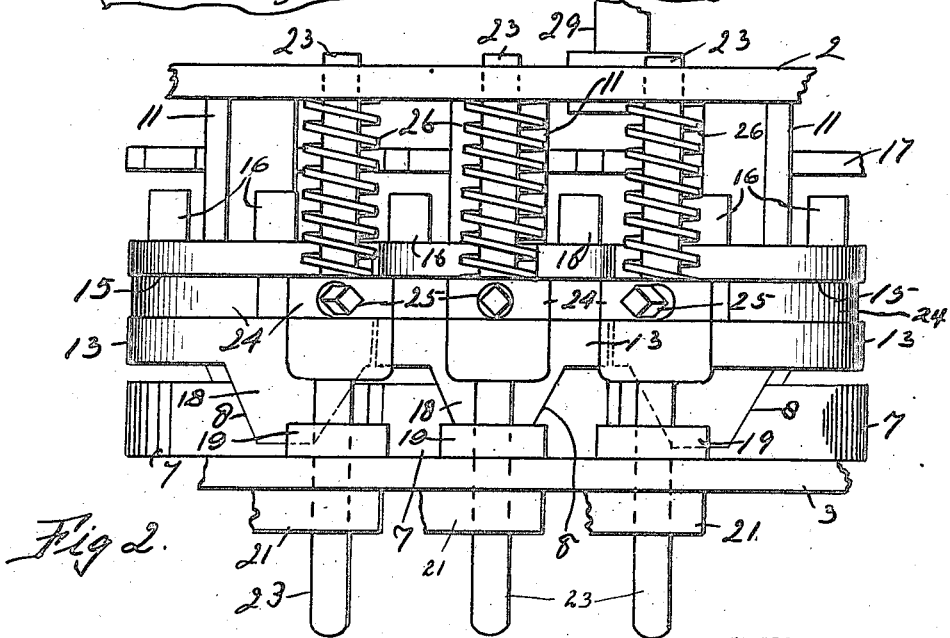
Fig. 2, is a side elevation thereof with portions broken away.

It is to be understood that there is a combination of operating parts for each driver-carrier disc as plainly shown in Fig. 2.

Of course I do not wish to be limited to the exact details of construction as herein shown as these may be varied within the limits of the appended claims without departing from the spirit of my invention.

Having thus fully described my invention, what I claim as new and useful is:—

1. A lace braiding machine comprising a raceway plate, a bottom plate, a plurality of posts fixed to the bottom plate, a locking block having oppositely disposed V shaped notches therein carried by each of said posts and rigidly connected therewith, a driver-carrier disc rotatably mounted upon each of said posts and provided with a shank or barrel having a rectangular portion, a combined driving and locking member slidably mounted on said rectangular portion, said member having tapered locking horns thereon for registration with the notches in the locking block during the downward movement of said member and further provided with upwardly projecting gear pins to be moved in the path of travel of a rack when said member is moved upward, and means for raising said member.

2. A lace braiding machine comprising a raceway plate, a bottom plate, a plurality of posts fixed to the bottom plate, a locking block having oppositely disposed V shaped notches therein carried by each of said posts and rigidly connected therewith, a driver-carrier disc rotatably mounted upon each of said posts and provided with a shank or barrel having a rectangular portion, a combined driving and locking member slidably mounted on said rectangular portion, said member having tapered locking horns thereon for registration with the notches in the locking block during the downward movement of said member and further provided with upwardly projecting gear pins to be moved in the path of travel of a rack when said member is moved upward, a plurality of posts slidably mounted in the raceway bottom plates, an arm adjustably mounted on each rod and adapted to engage a combined driving and locking member, a spring for assisting gravity in normally forcing said arm and its associated parts downward, and means actuated by the Jacquard mechanism for raising said arm and its associated parts.

3. A lace braiding machine comprising a raceway plate having intersecting race circle openings, a bottom plate, posts fixed to the bottom plate centrally of the race circle openings, a locking block having diametrically opposite V shaped notches carried by each of said posts and resting upon the bottom plate, a driver-carrier disc rotatably mounted on each of said posts, a barrel having a rectangular exterior portion formed with said disc the lower end of which rests on said locking block, a combined operating and locking member slidably mounted on said rectangular portion of the barrel, tapered locking horns projecting downwardly from said member for registration with the aforementioned notches when said member is moved downward, upwardly projecting gear pins carried by said member, an oscillating rack adapted to be engaged by said gear pins whereby rotary motion may be transmitted to the driver-carrier disc, a plurality of externally threaded bushings mounted in the bottom plate, rods slidably mounted in said bushings and passing through the raceway plate one of said rods being located adjacent each post, arms adjustably mounted on each of said rods for engagement with the combined operating and locking members, a spring mounted on each rod and interposed between the raceway plate and arm for normally forcing the same downward, a bracket having threaded connection with each bushing, and a bell crank lever pivoted to said bracket one arm of which engages the rod and the other arm having connection with a Jacquard mechainsm whereby said rod and its associated parts will be raised.

4. In a device of the character stated, a bottom plate, a locking block having oppositely disposed V shaped notches and a central recess, a fixed post the lower end of which is threaded and adapted to pass through the locking block and the bottom plate, a collar formed integral with said post adjacent its lower end, said collar registering with the recess in the locking block, and a nut on the threaded end of said post for securely fastening the latter and the locking block upon the bottom plate.

In testimony whereof, I have hereunto affixed my signature.

EDWIN LEROY SMITH.